United States Patent [19]

Spector

[11] Patent Number: 4,686,353
[45] Date of Patent: Aug. 11, 1987

[54] AROMA-GENERATING AUTOMOBILE CIGARETTE LIGHTER

[76] Inventor: Donald Spector, 380 Mountain Rd., Union City, N.J. 07087

[21] Appl. No.: 835,223

[22] Filed: Mar. 3, 1986

Related U.S. Application Data

[63] Continuation-in-part of Ser. No. 658,778, Oct. 9, 1984, Pat. No. 4,574,181.

[51] Int. Cl.$^4$ .............................. F23Q 7/00; A61L 9/03
[52] U.S. Cl. .................................. 219/275; 219/273; 219/260
[58] Field of Search ............... 219/271, 272, 273, 274, 219/275, 276, 260, 263, 264, 265, 267; 422/305, 306, 125; 239/135, 136, 44, 47, 51.5, 53, 54, 55, 56, 57, 58, 59, 60

[56] References Cited

U.S. PATENT DOCUMENTS

| | | | |
|---|---|---|---|
| 2,201,952 | 5/1940 | Cohen | 219/264 |
| 2,605,380 | 7/1952 | Bauman | 219/263 |
| 3,006,042 | 10/1961 | Calandra | 219/271 |
| 3,551,092 | 12/1970 | Masson | 219/276 |
| 3,621,196 | 11/1971 | Sammet | 219/267 |
| 4,574,181 | 3/1986 | Spector | 219/274 |

FOREIGN PATENT DOCUMENTS

| | | | |
|---|---|---|---|
| 236177 | 12/1959 | Australia | 264/ |
| 2062199 | 5/1981 | United Kingdom | 219/260 |

Primary Examiner—E. A. Goldberg
Assistant Examiner—Teresa J. Walberg
Attorney, Agent, or Firm—Michael Ebert

[57] ABSTRACT

A cigarette lighter adapted to function also as an aroma generator. The lighter is insertable into a socket in the dashboard of an automobile, the socket having terminals connected to the vehicle battery. The lighter includes a case that fits into the socket and a spring-biased hollow plunger that is telescoped in the case. The plunger is formed from a cylindrical shell having a cage projecting from its open rear end and terminating in a ring serving as the plunger knob. Attached to the front end of the shell is a heater unit which, in the inactive state of the plunger, lies within the case. To activate the lighter, the user presses in the plunger to advance the heater unit until its contacts are engaged by the socket terminals, one of which is a latching bi-metallic element, thereby energizing the unit. The resultant heat which is transferred to the interior of the shell also acts to deform and unlatch the bi-metallic element thereby disengaging the terminals and causing the released plunger to return to its inactive state. Receivable within the plunger is a replaceable fragrance cartridge having a shank which projects into the shell interior, the shank supporting a heat-responsive, aroma-generating element that is activated by the interior heat to exude an aromatic vapor that is vented into the interior of the vehicle.

5 Claims, 6 Drawing Figures

AROMA-GENERATING AUTOMOBILE CIGARETTE LIGHTER

RELATED APPLICATION

This application is a continuation-in-part of my copending application Ser. No. 658,778, filed Oct. 9, 1984, entitled "Aroma-Generating Cigarette Lighter" now U.S. Pat. No. 4,574,181 whose entire disclosure is incorporated herein by reference.

BACKGROUND OF INVENTION

1. Field of Invention

This invention relates generally to a cigarette lighter adapted to also function as an aroma generator and more particularly to a lighter of this type provided with a replaceable heat-responsive fragrance cartridge which gives off an aromatic vapor that is discharged into the interior of the vehicle when the lighter is activated by the user.

2. Status of Art

As used herein, the term "aroma" is not limited to pleasant or savory smells but encompasses scents that function as air fresheners, deodorants or any other odor that acts to condition, modify or otherwise change the atmosphere.

The aroma of perfumes and perfume-based products such as colognes and toilet waters was originally derived from the essential oils of plants. However, since the early 19th century, chemists have succeeded in analyzing many essential oils and in creating thousands of synthetics, some simulating natural products and other yielding altogether new scents. Perfumes today are largely blends of natural and synthetic scents and of fixatives which equalize vaporization and enhance pungency. In most liquid scents, the ingredients are combined with alcohol.

Various types of spray devices or dispensers are known for emitting aromas. Thus the patent to Dearling, U.S. Pat. No. 3,330,481, discloses a dispenser for wafting into the atmosphere an insecticide, a pleasant smelling scent or any other aroma, this being accomplished by means of a pressurized container. When the actuating button of this container is pressed, a dispersant is released onto an absorbent material, the absorbent dispersant permeating the atmosphere.

None of these prior art devices is particularly adapted for use in an automotive interior, an environment having special requirements. The atmosphere in most automobiles is somewhat unpleasant, for it is often permeated by exhaust and engine fumes, by odors emanating from the road, and in many cases by tobacco smoke. Hence, it becomes desirable to mask or supplant these odors by more agreeable scents.

While a perfume odor may be desirable in a vehicle, inasmuch as personal tastes differ and the choice of fragrance may also depend on other variables, the availability of an aroma dispenser providing a single scent falls short of what is required. Moreover, in some instances the aroma called for is not a perfume but a scent acting as a stimulant to keep the driver awake under driving conditions that may be soporific. Thus the type of pleasing scent that may be appropriate for a morning drive is usually not the same as that suitable for dusk; whereas when driving late at night, what may then be desirable is an odor which, though perhaps unpleasant, functions to stimulate and awaken rather than relax the driver.

My prior U.S. Pat. No. 4,200,229 discloses an aroma-dispenser which is mountable under the dashboard of an automobile and takes the form of a replaceable cartridge receivable in a stationary holder so that the user can insert therein whichever cartridge gives off an aroma suitable for a given occasion or satisfying a personal preference. The cartridge, in this instance, includes a bottle containing a liquid scent and a hand-operated suction pump which when actuated serves to spray a liquid scent into the car interior. The Mangels U.S. Pat. No. 2,721,098 is also concerned with the disagreeable nature of tabacco smoke and other fumes permeating automobile interiors, and provides a deodorizer structure that is mountable in the vehicle.

In an automobile, the act of smoking is related to the standard cigarette lighter releasably held in a dashboard socket. In order for the driver or passenger in a front seat of the vehicle to light up, he must press the knob of the lighter. This action causes a spring-biased plunger having a disc-shaped heater element at its front end to advance and to bring the heater contacts into engagement with terminals connected to the car battery, thereby energizing the heater and causing it to glow. The plunger is retained in its advanced position by a bimetallic latching element; but when the heat produced by the heater reaches a predetermined temperature level, the latching element disengages the plunger which returns to its normal position. Though the heater is then deactivated, it has a relatively high heat capacity and continues to glow so that when the user withdraws the lighter from the dashboard socket, he can then light his cigarette from the still glowing heater.

In my copending application, there is disclosed an automobile cigarette lighter which, when operated by the user, generates an aromatic vapor which is exuded into the interior of the vehicle. This lighter is adapted to receive a replaceable heat-responsive fragrance cartridge which when the lighter is activated discharges an aromatic vapor. The present invention works on the same principle as the lighter disclosed in my copending application, but makes use of a more convenient and more effective form of replaceable cartridge.

The cartridge disclosed in my copending application is constituted by an open-ended tube containing a plug of porous material impregnated with a volatile liquid fragrance. This tube is received loosely within the hollow plunger of the lighter; hence, with vigorous vehicular vibration, the cartridge may be dislodged. Also, in order for the cartridge to operate efficiently, a stream of heated air must flow through the tube, and heated air extrinsic thereto is much less effective to cause volatilization of the fragrance within the tube.

It is known in the Masson U.S. Pat. No. 3,551,092, to provide a cigarette lighter that includes a chamber into which one can insert a pellet of aromatic material. But since this pellet is remote from the electrical heater unit, it is not an efficient aroma generator. Moreover, there is no replaceable cartridge in this reference.

SUMMARY OF INVENTION

In view of the foregoing, the main object of this invention is to provide an automobile cigarette lighter which when operated by the user, generates an aromatic vapor which is exuded into the interior of the vehicle, the lighter including a replaceable heat-responsive fragrance cartridge.

A significant feature of the invention lies in the fact that the cartridge is rendered effective only in the interval during which the heater unit is hot, this relatively short interval being predetermined by the characteristics of the heater structure. Hence, each time the lighter is pressed in, a limited dosage of aromatic vapor is generated. In this way, the user can avoid an excessive concentration of fragrance within the confines of the vehicle; and by intermittently pressing in the lighter to activate the heater, the user can maintain whatever concentration is desired.

Also an object of this invention is to provide an aroma-generating cigarette lighter which is also fully capable of functioning as an ignition source for cigarettes, so that the lighter may be used either to light a cigarette or to generate a pleasing aroma.

A cigarette lighter adapted to function also as an aroma generator. The lighter is insertable into a socket in the dashboard of an automobile, the socket having terminals connected to the vehicle battery. The lighter includes a case that fits into the socket and a spring-biased hollow plunger that is telescoped in the case. The plunger is formed from a cylindrical shell having a cage projecting from its open rear end and terminating in a ring serving as the plunger knob. Attached to the front end of the shell is a heater unit which, in the inactive state of the plunger, lies within the case. To activate the lighter, the user presses in the plunger to advance the heater unit until its contacts are engaged by the socket terminals, one of which is a latching bi-metallic element, thereby energizing the unit. The resultant heat which is transferred to the interior of the shell also acts to deform and unlatch the bi-metallic element thereby disengaging the terminals and causing the released plunger to return to its inactive state. Receivable within the plunger is a replaceable fragrance cartridge having a shank which projects into the shell interior, the shank supporting a heat-responsive, aroma-generating element that is activated by the interior heat to exude an aromatic vapor that is vented into the interior of the vehicle.

OUTLINE OF DRAWINGS

For a better understanding of the invention as well as other objects and further features thereof, reference is made to the following detailed description to be read in conjunction with the accompanying drawings, wherein.

Figure 6:
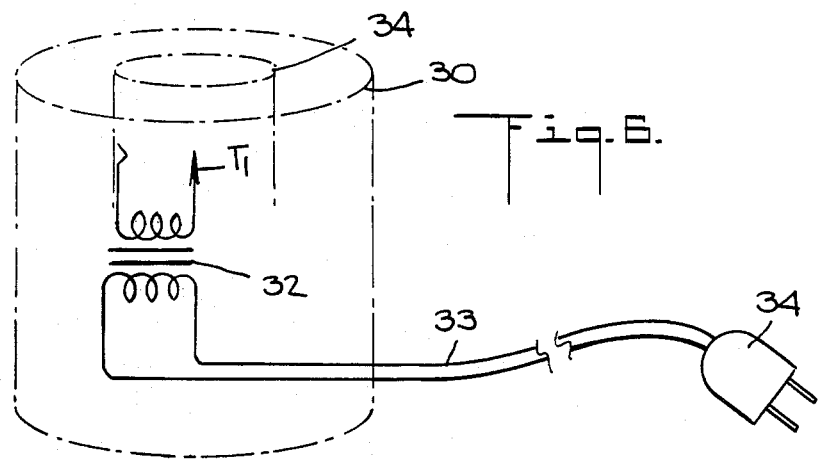

FIG. 6 schematically shows a table unit for receiving a lighter in accordance with the invention, the socket terminals being connected through a step-down transformer to an a-c power line.

DESCRIPTION OF INVENTION

First Embodiment

Referring now to FIGS. 1 to 5, a lighter in accordance with the invention is receivable in a standard cylindrical socket formed in the dashboard 10 of a vehicle, the lighter including a cylindrical metal case 11 which fits into the socket. Case 11 is provided with an inner liner 11A whose front end is shaped to form an annular turned-in ledge 12. The outer ends of case 11 and liner 11A are turned out to define a flange 13 that surrounds the opening of the socket in dashboard 10 and rests against the surface of the dashboard.

Figure 1:
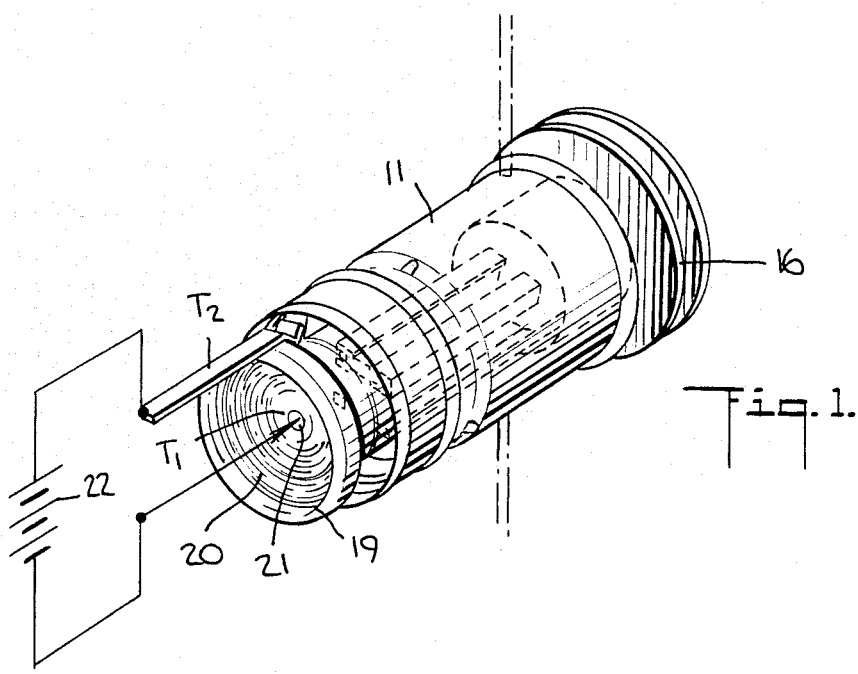
FIG. 1 is a perspective view, as seen from the rear, of an aroma-generating cigarette lighter in accordance with the invention shown in its activated state in which the contacts of the electrical heater unit included in the lighter are engaged by terminals connected to the battery of a vehicle.
Figure 3:
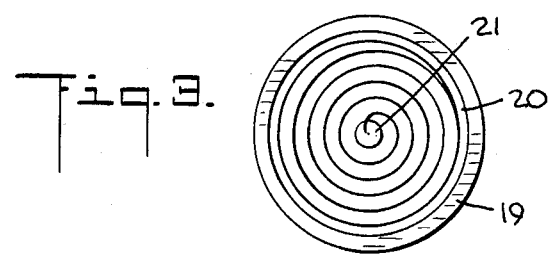
FIG. 3 is a front view of the electrical heater unit.
Figure 2:
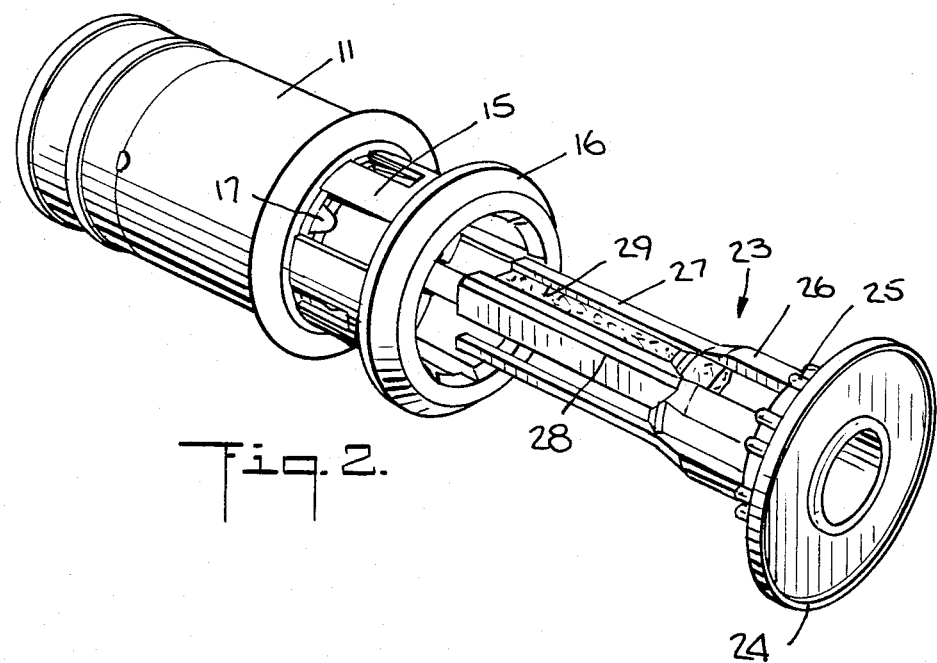
FIG. 2 is a perspective view as seen from the front of the lighter, with the fragrance cartridge partially withdrawn.

Telescoped within case 11 is a spring-biased plunger formed from a cylindrical metal shell 14 having a slotted plastic cage 15 projecting from its open rear end and extending beyond case 11. The cage which, as shown in FIG. 2, is formed by a circular array of parallel slats terminates in a ring 16 that serves as the knob of the plunger. As best seen in FIG. 2, the shell is joined to cage 15 by lugs 17. The spring bias for the plunger is provided by a helical spring 18 that surrounds shell 14 in the annular space between the shell and inner liner 11A, the spring being interposed between the rear end of ledge 12 and the front end of cage 15.

Attached to the closed front end of metal shell 14 is a heater unit constituted by a cup-shaped metal bezel 19 within which is nested a spiral strip 20 of electrical resistance material. In the inactive state of the lighter, bezel 19 rests against ledge 12. The inner end of the spiral is connected to a central electrode rod 21 which is insulated from the bezel and projects into the front end of shell 14. The outer end of the spiral is connected to the metal bezel. Hence, to energize the heater, a voltage must be applied between electrode 21 and bezel 19. The heater unit is designed to operate at the voltage of an automobile storage battery.

When the plunger is pressed in by a user, the electrical heater unit is projected from the front end of case 11 and is advanced until the center electrode 21 of the unit is engaged by a socket terminal $T_1$ and bezel 19 of the unit is engaged by a latching terminal $T_2$ which acts to retain the projected plunger in its activated position within the dashboard socket.

Terminals $T_1$ and $T_2$ are connected to opposite poles of car battery 22, as a consequence of which the electrical heater element 20 is energized and is caused to heat up and glow. Since the heater unit is attached to the closed front end of metal shell 14 and is in heat exchange relationship therewith, the heat is transferred by conduction to the interior of shell 14. This transference is enhanced by the heat-conducting electrode rod 21 which extends into the interior of the shell.

Figure 4:
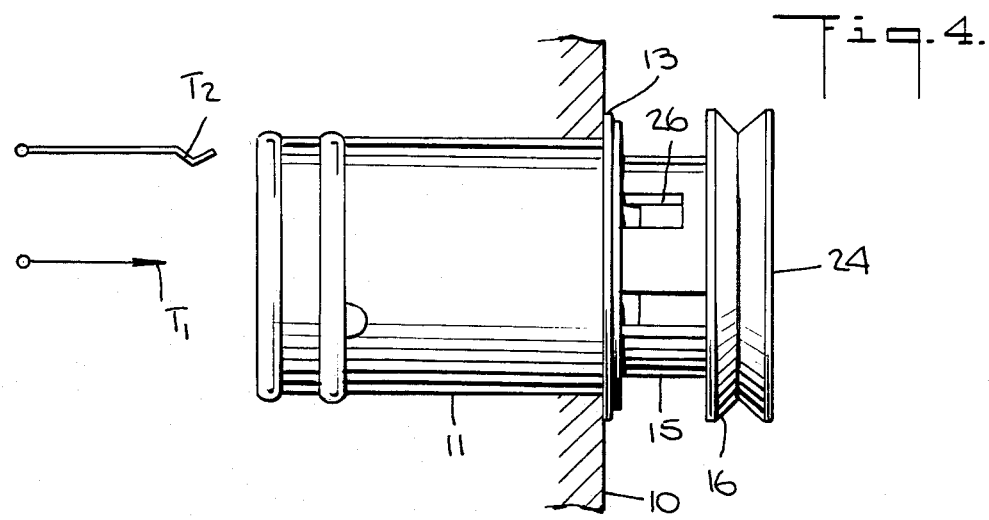
FIG. 4 is a side view of the unit in its inactive state.

When the temperature of the heater rises to a predetermined level, latching terminal $T_2$ which is formed of a bimetallic thermostatic material, deforms or bends to an extent releasing bezel 19. As a result, helical spring 18, which is compressed when the plunger is pressed in, expands to return the plunger to its normal inactive state, in which position, as shown in FIG. 4, terminals $T_1$ and $T_2$ are disengaged.

The heater has a substantial heat capacity and remains glowing for a few seconds after it is disconnected from the battery for a period sufficient to permit the user, if he wishes, to remove the lighter from the dashboard socket and light up a cigarette. However, if the lighter is not removed from the socket and has a fragrance cartridge inserted therein, to be later explained, then heat from the heater in the period during which it is energized and in the post-energization interval in which it remains hot, acts to volatilize the aromatic liquid in the cartridge to produce an aromatic vapor which is vented into the automobile interior.

As best seen in FIG. 2, the fragrance cartridge, generally identified by reference numeral 23, is constituted by an annular head 24 which, when the cartridge is fully inserted, lies against the knob ring 16 of the plunger cage, and a hollow shank formed by a ribbed collar 25 that frictionally engages the cage 15, a tubular section 26 constituted by a circular array of parallel slats, and four spaced slats longitudinally projecting from this section. Two of these slats 27 and 28 have a channel formation to define a track for receiving and retaining a rectangular pad 29 of porous material. The pad may be formed of cotton fibers, absorbent paper, open-cell foam plastic or any other highly absorbent material. The pad is impregnated with a volatile liquid fragrance whose aroma is pleasing or stimulating.

Figure 5:
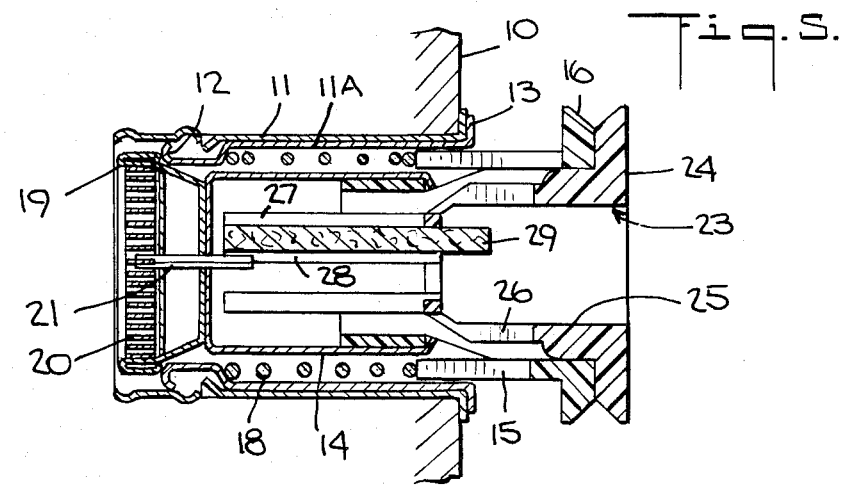
FIG. 5 is a longitudinal section taken through the unit shown in FIG. 4.

When, therefore, as shown in FIG. 5, the cartridge is fully inserted in the lighter and the lighter is activated, the resultant heat in the interior of shell 14 acts to volatilize the liquid fragrance to produce an aromatic vapor which is discharged into the atmosphere of the vehicle through the various vents in the lighter. When the cartridge is exhausted, it may be replaced with a fresh cartridge. The user may be supplied with a bank of cartridges of different fragrances, so that he can select a desired fragrance.

Second Embodiment

In the embodiment of the invention shown in FIGS. 1 to 5, the aroma-generating lighter is inserted into a dashboard socket and is energized by the car battery. In the embodiment shown in FIG. 6, the same lighter may be used in a home or office environment, both as combined cigarette lighter and aromatic generator so as to render the atmosphere pleasant. To this end, a table unit 30 is provided which may be in any decorative form, the unit having a socket 31 therein which is similar to a dashboard socket for receiving a standard cigarette lighter. Socket 31 is provided with terminals $T_1$ and $T_2$ to engage the contacts of the heater element when the lighter is activated.

Housed in unit 30 is a step-down transformer 32 whose primary is connected by a cable 33 to a plug 34 that is insertable in a standard high-voltage a-c power line outlet. The secondary of the transformer is connected to terminals $T_1$ and $T_2$ to provide a low a-c voltage of the same magnitude as a standard car battery. In this instance, the lighter is energized by a-c, not d-c; but the operation in all other respects being the same as in the final embodiment.

While there have been shown and described a preferred embodiment of an AROMA-GENERATING AUTOMOBILE CIGARETTE LIGHTER in accordance with the invention, it will be appreciated that many changed and modifications may be made therein without, however, departing from the essential spirit thereof.

I claim:

1. A cigarette lighter adapted to function also as an aroma generator, the lighter being insertable into a socket having terminals which are connected to a power source, one of which is a latching bi-metallic element, said lighter comprising:
   A. a case that fits into the socket;
   B. a spring-biased hollow plunger formed from a cylindrical metal shell having a vented cylindrical cage projecting from its open rear end and terminating in a ring serving as the plunger knob;
   C. an electrical heater unit attached to the front end of the shell and which in the inactive state of the plunger lies within the case, the unit having contacts, whereby when a user presses in the plunger, the contacts are engaged by the socket terminals to energize the unit and the unit is then latched by the latching element, the resultant heat being transferred to the interior of the shell and also acting to deform the latching element, thereby disengaging the terminals and causing the released plunger to return to its inactive state; and
   D. a removable vented cartridge insertable into the plunger and having therein a heat-responsive, aroma-generating element that is activated by the interior heat to exude an aromatic vapor, said heater unit being formed by a cup-shaped bezel and a spiral strip of electrical resistance material nested in the bezel, one end of the strip being connected to the bezel which is engaged by the latching terminal, the other end of the strip being connected to a center electrode that is engaged by the other terminal, said center electrode having a metal rod attached thereto which extends into the interior of the metal shell to a point adjacent said aroma-generating element to transfer heat from the heater unit to the element and thereby promote the generation of the aroma.

2. A lighter as set forth in claim 1, wherein said shell has a closed front end which is attached to said bezel and is in heat exchange relationship therewith.

3. A lighter as set forth in claim 1, wherein said cartridge has an annular head attached to the shank, said head when the cartridge is fully inserted, lying against said ring.

4. A lighter as set forth in claim 1, wherein said shell is formed by a circular array of parallel slats.

5. A lighter as set forth in claim 4, wherein said cartridge includes a circular array of parallel slats.

* * * * *